United States Patent [19]

Gulko

[11] Patent Number: 4,627,459
[45] Date of Patent: Dec. 9, 1986

[54] PNEUMATIC PRESSURE TRANSMITTER

[76] Inventor: Izrail B. Gulko, #305-1121-15 Ave SW., Calgary, Alberta, Canada, T2R 0S8

[21] Appl. No.: 728,441

[22] Filed: Apr. 29, 1985

Related U.S. Application Data

[63] Continuation-in-part of Ser. No. 558,388, Dec. 5, 1983, abandoned.

[51] Int. Cl.⁴ ............................................. G05D 16/06
[52] U.S. Cl. .............................. 137/116.5; 137/505.46
[58] Field of Search ..................... 137/116.5, 505.46

[56] References Cited

U.S. PATENT DOCUMENTS

| | | | |
|---|---|---|---|
| 1,611,263 | 12/1926 | Bihl | 137/505.46 |
| 3,207,175 | 9/1965 | Pauly | 137/116.5 X |
| 3,856,042 | 12/1974 | Fletcher | 137/505.42 |

FOREIGN PATENT DOCUMENTS

| | | | |
|---|---|---|---|
| 124143 | 4/1931 | Austria | 137/505.46 |
| 590784 | 6/1925 | France | 137/505.46 |

Primary Examiner—Robert G. Nilson

[57] ABSTRACT

The invention presents a new means for accurate pressure setting and converting electrical signals into pneumatic signals. New pressure regulating means close the inlet port against the flow and utilize a balance system, which reduces the supply pressure effect and operating force. These improvements allow the use of small size stepped motors and provide automatical or manual operation. Electrical to pressure convertors, pressure regulators, electrical to pressure relay, control valve positioners, boosters and others can be developed by using the new means.

2 Claims, 2 Drawing Figures

PNEUMATIC PRESSURE TRANSMITTER

This application is a continuation-in-part of my U.S. patent application entitled "Pneumatic Pressure Transmitter", Ser. No. 558,388, filed Dec. 5, 1983, and now abandoned.

That invention pertains to the field of instrumentation and in particular to the pressure handling means and electrical to pressure convertors. Such devices are widely used as interfaces between computers and control valves or other power operated equipment. The current pressure regulating means can not be used for such purposes because their output is dependent on supply and control pressure and large force is necessary to operate them. Presently the nozzle-flapper type transducers and boosters are used to convert electrical signals into pressure. They are complicated, require continuous air/gas discharge, etc. The proposed pressure regulating means for forward and backward flow close the inlet port against the flow, use the exhaust port for air discharge and provide smooth regulation. A balance system eliminates the supply pressure effect, and a low power stepped motor provide the sufficient reference force. The use of a stepped motor without gears allows the operation of the pneumatic pressure transmitter automatically or manually. The same pressure regulating means can be used for pressure regulators, different kinds of electrical to pressure convertors, control valve positioners, boosters and others.

In drawings which illustrate embodiment of the invention:

Figures 1, 2:
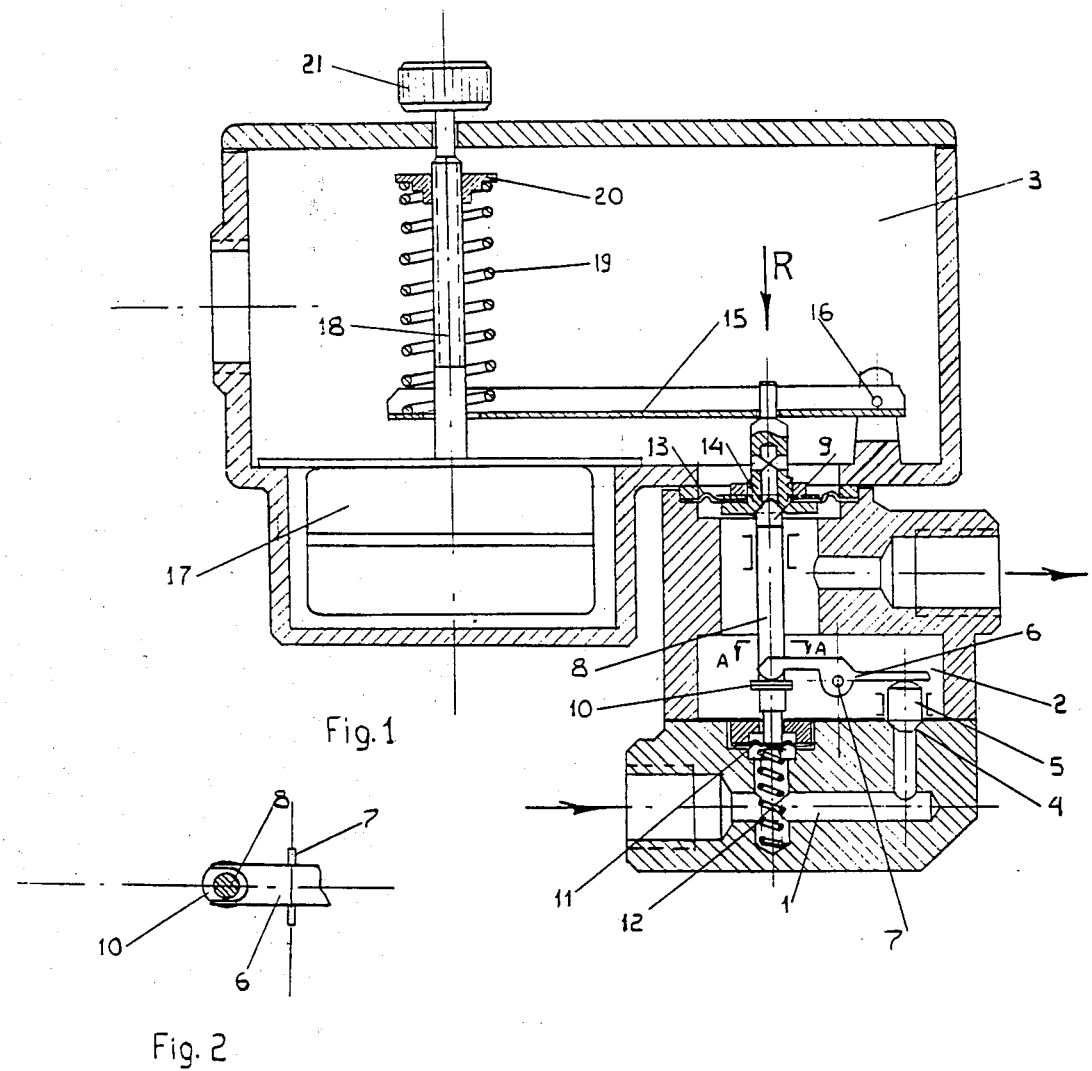
FIG. 1 is an elevation of a pneumatic pressure transmitter.
FIG. 2 is a cross section "AA" of FIG. 1.

Referring to the drawing in detail, it will be seen that the embodiment of the invention which has been illustrated comprises a supply pressure chamber 1, a control pressure chamber 2, and a reference pressure chamber 3. The main parts—regulating mechanism—are located in the control pressure chamber: an inlet plug 5, a lever 6 with a pivot 7, a stem 8 with an exhaust plug 9 and a snap ring and washer 10, referred to as a shouldermount. One arm of the lever 6 is fork shaped (See FIG. 2) and rests by its prongs on the shouldermount 10. A balance diaphragm 11 separates the control pressure chamber 2 and the supply pressure chamber 1 and creates a balance force proportional to the difference between supply and control pressure. That force, together with the force of an auxilliary spring 12, is applied to stem 8. A loading diaphragm 13 with an exhaust port 14 separates the control pressure chamber 2 and reference pressure chamber 3. The direction of reference force is shown by arrow "R". When control pressure is counterbalanced by the reference force "R", the inlet and exhaust ports are closed by the inlet and exhaust plugs. Excess pressure in the control pressure chamber lifts the loading diaphragm and opens the exhaust port 14; one arm of the lever 6 keeps the stem with the exhaust plug 9 from following the exhaust port, while the other arm of the lever pushes the inlet plug 5 closing the inlet port 4. The lack of pressure in the control pressure chamber moves the diaphragm 13 in the opposite direction, closes the exhaust port, pushes the stem 8, removes or reduces the force from the lever 6 and, consequently, from the inlet plug 5, and the force of supply pressure opens the inlet port. The balance force together with the force of the auxilliary spring 12 has to be sufficient to keep the inlet and exhaust ports closed under set conditions.

Refer to the reference pressure chamber 3. It houses a loading lever 15 with a pivot 16 fixed at the frame, a stepped motor 17 with a leadscrew 18, a loading spring 19, a nut 20 and a knob 21 at the end of the leadscrew. The lever 15 is used to reduce the operating force and to shift the shaft of the motor. Rotation of the leadscrew 18 causes the nut 20 to compress or release the spring 19 and, consequently, to change the reference force "R". The rotation of the leadscrew 18 can be performed automatically by the stepped motor 17 or manually by the knob 21.

It is understood that the form of the invention herewith described is to be taken as a preferred embodiment. Various changes can be made, for example: different types of plugs or shapes of lever can be used, different means can be used to put a reference force on the loading diaphragm, etc.

What is claimed is:

1. A pneumatic pressure transmitter for accurate pressure setting having a pressure regulating means comprising a frame with a supply pressure chamber, a control pressure chamber and a reference pressure chamber, a loading diaphragm which separates the control pressure chamber and the reference pressure chamber, a loading spring for putting a reference force on the the loading diaphragm; an exhaust port in the centre of said diaphragm, means for ventilation of excess pressure from the control pressure chamber; the control pressure chamber contains an inlet port in communication with the supply pressure chamber; an inlet plug means for closing the inlet port; a stem having a shouldermount (10) on its surface, and an exhaust plug at one end for closing the exhaust port; a two arm lever with a pivot fixed at the frame, one arm of said lever is fork shaped and rests by its prongs on the shouldermount, the other arm pushes the inlet plug closing the inlet port; a balance diaphragm separates the supply pressure chamber from the control pressure chamber and creates a balance force proportional to the difference between supply and control pressure, that force is applied to the other end of the stem; an auxilliary spring means for putting an additional force at the stem; said inlet and exhaust ports, stem with the exhaust plug and shouldermount, lever, inlet plug, loading diaphragm, balance diaphragm and auxilliary spring interact in such a way, that force created by the balance diaphragm and the auxilliary spring pushes the stem and, through the shouldermount, pushes the fork shaped arm of the lever, while the other arm of said lever pushes the inlet plug and closes the inlet port; when the reference force is counterbalanced by the pressure in the control pressure chamber, the loading diaphragm with the exhaust port moves onto the exhaust plug and closes the exhaust port; the balance force together with the force of the auxilliary spring is sufficient to keep the both ports closed; whereby a surplus pressure in the control pressure chamber lifts the loading diaphragm with the exhaust port and opens said port, while the fork shaped arm of the lever prevents the stem with the exhaust plug from following the exhaust port; the other arm of the lever pushes the inlet plug and keeps the inlet port closed; lack of pressure in the control pressure chamber moves the loading diaphragm in the opposite direction, and that action closes the exhaust port, pushes the stem, removes or reduces the force from the fork shaped arm of the lever and, consequently, from the inlet plug, whereby the force of supply pressure opens the inlet port.

2. The pneumatic pressure transmitter having the pressure regulating means as defined in claim 1 further comprising: a box which serves as the reference pressure chamber and houses a stepped motor for automatic regulation, a leadscrew which is a prolongation of the stepped motor's shaft, a loading spring means for creating a reference force, a nut means for compressing said spring, a loading lever means for reducing the force of the loading spring; a pivot of said lever is fixed in the box; a knob fixed at the other end of the leadscrew outside the box, for manual regulation; the pressure regulating means is fixed to the bottom of the box, and a hole in the box provides access to the loading diaphragm; rotation of the leadscrew causes the nut to compress or release the loading spring, which pushes the long arm of the loading lever while its short arm puts a reference force on the loading diaphragm, whereby the control pressure is changed; the rotation of the leadscrew can be performed automatically by the stepped motor or manually by the knob.

* * * * *